(12) United States Patent
Uchiyama et al.

(10) Patent No.: US 11,892,162 B2
(45) Date of Patent: Feb. 6, 2024

(54) PREMIXED COMBUSTION BURNER

(71) Applicant: KAWASAKI JUKOGYO KABUSHIKI KAISHA, Kobe (JP)

(72) Inventors: Yuta Uchiyama, Kobe (JP); Takahiro Uto, Kobe (JP); Atsushi Horikawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 144 days.

(21) Appl. No.: 17/599,784

(22) PCT Filed: Mar. 25, 2020

(86) PCT No.: PCT/JP2020/013210
§ 371 (c)(1),
(2) Date: Sep. 29, 2021

(87) PCT Pub. No.: WO2020/203518
PCT Pub. Date: Oct. 8, 2020

(65) Prior Publication Data
US 2022/0146093 A1    May 12, 2022

(30) Foreign Application Priority Data

Mar. 29, 2019  (JP) .................................. 2019-066857

(51) Int. Cl.
*F23D 14/78*  (2006.01)
*F23D 14/58*  (2006.01)

(52) U.S. Cl.
CPC ............. *F23D 14/78* (2013.01); *F23D 14/58* (2013.01)

(58) Field of Classification Search
CPC .................................. F23D 14/58; F23D 14/78
(Continued)

(56) References Cited

U.S. PATENT DOCUMENTS 1,254,507 A * 1/1918 Kahn ..................... F23D 11/44
431/243
2010/0101229 A1  4/2010 York et al.
(Continued)

FOREIGN PATENT DOCUMENTS

DE          26 43 293 A1     3/1978
JP        2013-174367 A      9/2013
(Continued)

*Primary Examiner* — Vivek K Shirsat
(74) *Attorney, Agent, or Firm* — Oliff PLC (57) ABSTRACT

A premixed combustion burner includes: a mixing part including a first peripheral wall having a center burner axis, a mixing region for mixing fuel and air in the first peripheral wall, and air supply ports arranged circumferentially and open in the first peripheral wall; a nozzle on the mixing part side, a second peripheral wall having a center burner axis, a premixed gas passage continuous to the second peripheral wall mixing region, and a cooling passage in the second peripheral wall; and a header part proximal to the mixing part, and a first header chamber with a fuel supply port, second header chamber, and fuel ejection port for communication between the second header chamber and mixing region. The first peripheral wall has an outward path connecting the first header chamber and a cooling passage inlet, and a return path connecting cooling passage outlet and the second header chamber.

3 Claims, 7 Drawing Sheets (58) Field of Classification Search
USPC .................................................. 431/195, 243
See application file for complete search history.

(56) References Cited

U.S. PATENT DOCUMENTS

2014/0144144 A1 5/2014 Hirata et al.
2017/0321609 A1 11/2017 Ogata et al.

FOREIGN PATENT DOCUMENTS

| JP | 2015-161460 A | 9/2015 |
| JP | 2016-090141 A | 5/2016 |

\* cited by examiner

PREMIXED COMBUSTION BURNER

CROSS-REFERENCE TO RELATED APPLICATIONS

This is a National Stage of International Application No. PCT/JP2020/013210 filed Mar. 25, 2020, which claims priority of Japanese Application No. 2019-066857 filed Mar. 29, 2019. The disclosure of the prior applications is hereby incorporated by reference herein in its entirety.

TECHNICAL FIELD

The present invention relates to premixed combustion burners in which gas fuel and air are premixed in advance, to be ejected.

BACKGROUND ART

To date, premixed combustion burners in which premixed gas obtained by mixing fuel and oxygen at an optimum ratio in advance and the resultant gas is combusted at the nozzle tip have been known. Such a premixed combustion burner is advantageous in that stable flame can be obtained since air is mixed into fuel in advance. Meanwhile, the premixed combustion burner has problems as follows. That is, when gas fuel that has a high combustion speed such as hydrogen gas is combusted, flame comes close to the vicinity of the nozzle tip, thereby causing high temperatures, thinning due to oxidation, and erosion of components, or flashback. Flashback is a phenomenon in which flame goes back from the nozzle tip to the gas supply side.

PTL 1 proposes a technology of preventing flashback in a premixed combustion burner. The premixed combustion burner of PTL 1 includes: a fuel passage including a turn-back portion that turns back fuel so as to flow between a proximal end side and a distal end side; a premixed gas passage surrounding the fuel passage; a fuel introduction portion that introduces the fuel having passed through the fuel passage, toward the distal end side of the premixed gas passage from the proximal end side thereof; and an air supply part that supplies, on the proximal end side, air to the premixed gas passage. In this premixed combustion burner, fuel having a low temperature passes through the turn-back portion provided in the fuel passage, whereby the outer periphery of the fuel passage is cooled. Flame having advanced into the premixed gas passage is extinguished due to the interference of the outer periphery of the fuel passage having a low temperature.

CITATION LIST

Patent Literature

PTL 1: Japanese Laid-Open Patent Publication No. 2016-90141

SUMMARY OF INVENTION

Technical Problem

In the premixed combustion burner of PTL 1, among the aforementioned problems of the premixed combustion burner, flashback can be prevented. However, it cannot be said that the problems of high temperatures, thinning due to oxidation, and erosion, of components, caused by flame coming close to the vicinity of the nozzle tip have been sufficiently solved.

The present invention has been made in consideration of the above circumstances. An object of the present invention is to propose a technology of, in a premixed combustion burner, preventing high temperatures, thinning due to oxidation, and erosion, of components, caused by flame coming close to the vicinity of the nozzle tip.

Solution to Problem

A premix burner according to one mode of the present invention includes:

a mixing part that includes a first peripheral wall having a burner axis as a center thereof, that includes a mixing region for mixing gas fuel and air at an inner periphery of the first peripheral wall, and that includes a plurality of air supply ports arranged in a circumferential direction and open in the first peripheral wall;

a nozzle part that is on a leading end side of the mixing part, that includes a second peripheral wall having the burner axis as a center thereof, that includes a premixed gas passage continuous to the mixing region at an inner periphery of the second peripheral wall, and that includes a cooling passage formed in the second peripheral wall; and a header part that is on a proximal end side of the mixing part, and that has therein a first header chamber, a fuel supply port configured to supply the gas fuel to the first header chamber, a second header chamber, and a fuel ejection port that allows communication between the second header chamber and the mixing region, wherein the first peripheral wall has therein an outward path that connects the first header chamber and an inlet of the cooling passage, and a return path that connects an outlet of the cooling passage and the second header chamber.

In the premixed combustion burner having the above configuration, a series of fuel flow paths composed of the first header chamber, the outward path, the cooling passage, the return path, and the second header chamber is formed. Gas fuel having a low temperature flows in this fuel passage. Accordingly, the peripheral wall of the nozzle part and the peripheral wall of the mixing part are cooled through heat exchange with the gas fuel having a low temperature and flowing therein.

In the premixed combustion burner having the above configuration, the peripheral wall of the nozzle part is cooled, and the temperature of the surface of the peripheral wall is suppressed from becoming high. Therefore, generation of oxide scale at the surface of the peripheral wall of the nozzle part is suppressed, and accordingly, thinning due to oxidation of the nozzle part is suppressed.

In the premixed combustion burner having the above configuration, rise in the temperature of the premixed gas passing through the premixed gas passage is suppressed by cooling of the nozzle part. Therefore, increase in the combustion speed of the premixed gas can be suppressed. Further, since rise in the temperature of the premixed gas is suppressed also by cooling of the peripheral wall of the mixing part, increase in the combustion speed of the premixed gas can be further effectively suppressed.

As described above, in the premixed combustion burner, increase in the combustion speed of the premixed gas is suppressed. Therefore, when compared with a case where the nozzle part is not cooled, flame can be kept away from the nozzle tip. Accordingly, the temperature of the nozzle part can be further suppressed from becoming high, and erosion of the nozzle part due to flame can be prevented. Further, in the premixed combustion burner having the above configuration, increase in the combustion speed is suppressed as described above, and thus, occurrence of flashback is suppressed.

Advantageous Effects of Invention

The present invention can propose a technology of, in a premixed combustion burner, preventing high temperatures, thinning due to oxidation, and erosion, of the components, caused by flame coming close to the vicinity of the nozzle tip.

DESCRIPTION OF EMBODIMENTS

Figure 1:
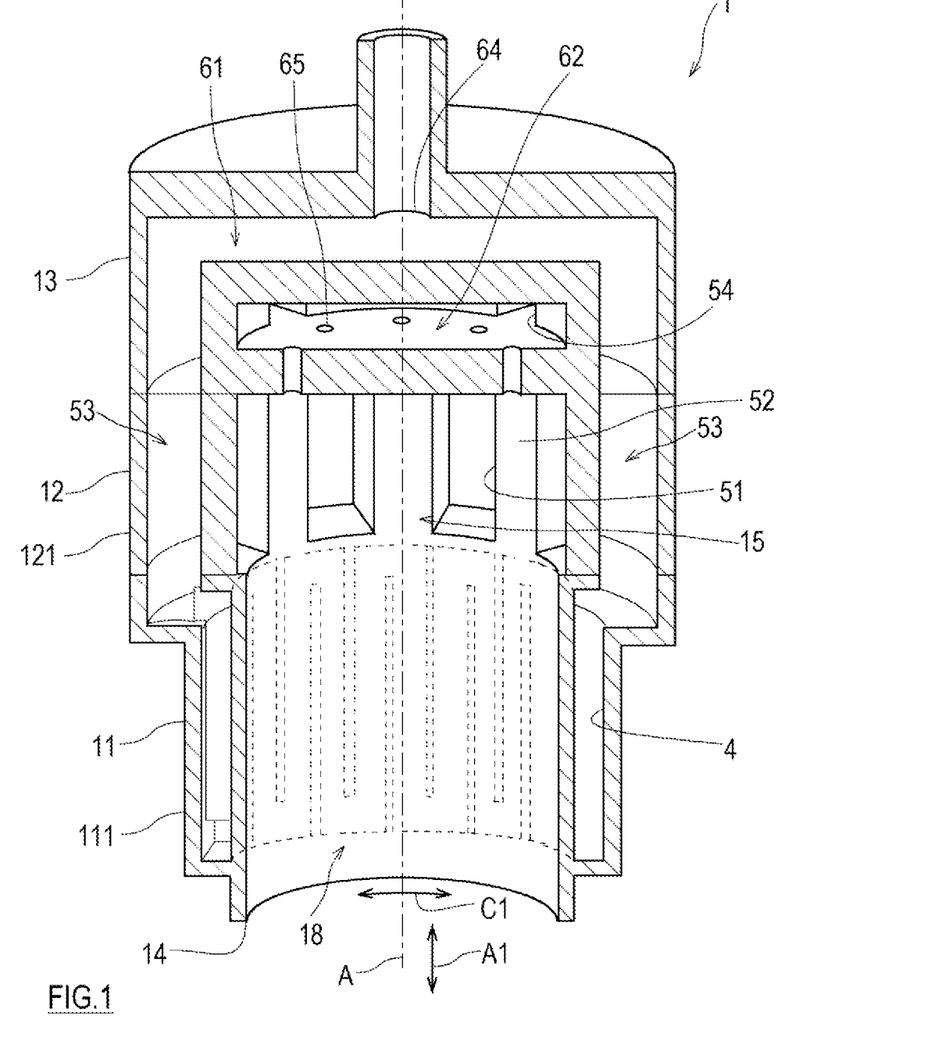
FIG. 1 is a cross-sectional perspective view of a premixed combustion burner according to an embodiment of the present invention.
Figure 2:
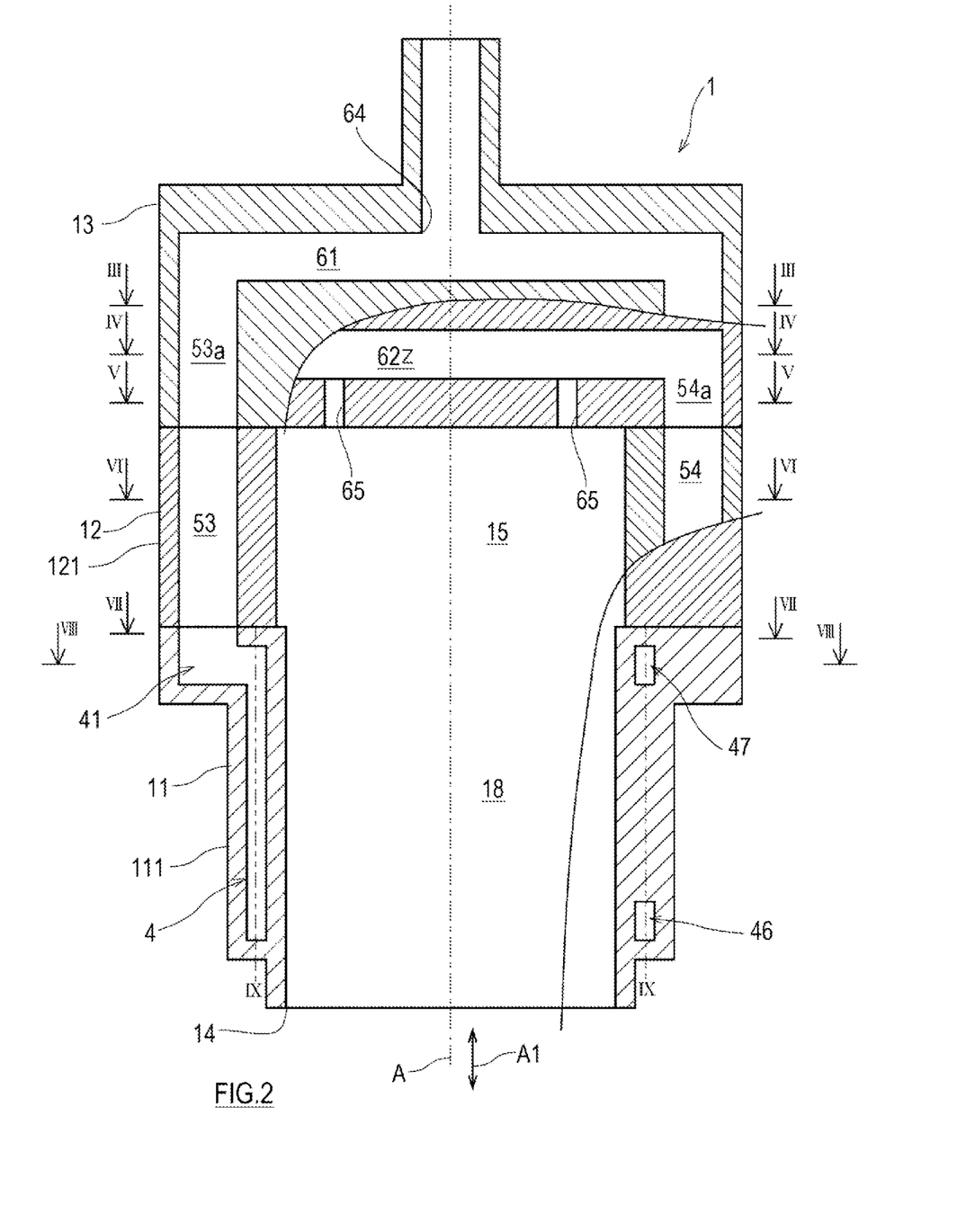
FIG. 2 is a cross-sectional view of the premixed combustion burner shown in FIG. 1.
Figure 3:
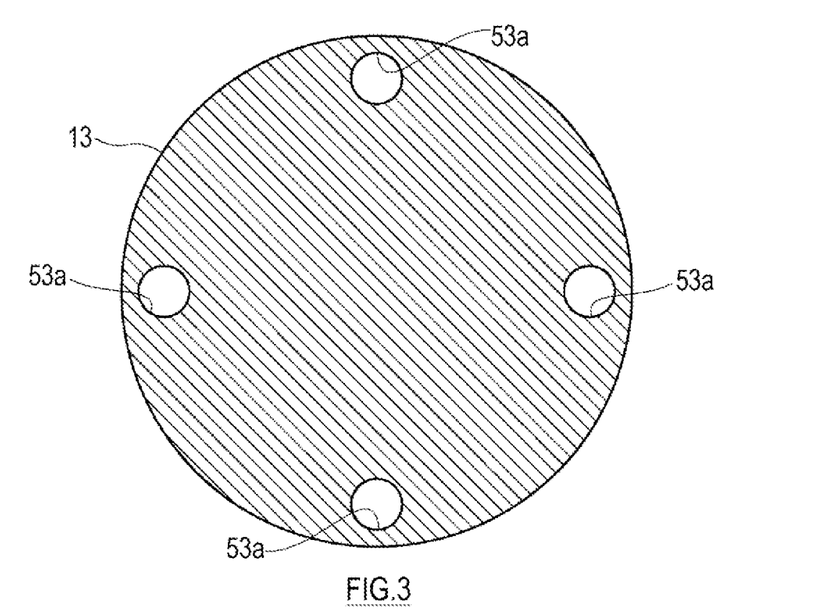
FIG. 3 is a cross-sectional view along III-III shown in FIG. 2.
Figure 4:
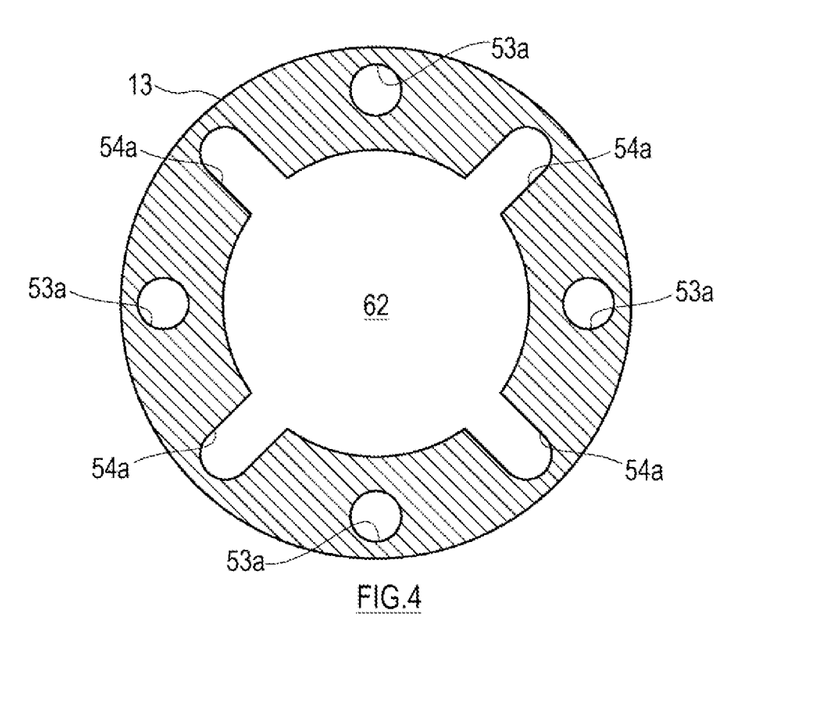
FIG. 4 is a cross-sectional view along IV-IV shown in FIG. 2.
Figure 5:
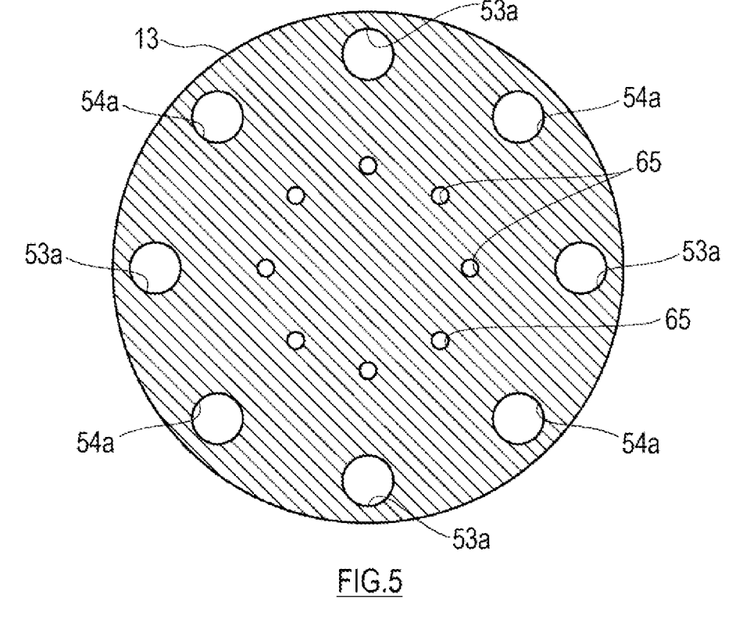
FIG. 5 is a cross-sectional view along V-V shown in FIG. 2.

FIG. 1 is a cross-sectional perspective view of a premixed combustion burner 1 according to an embodiment of the present invention. FIG. 2 is a cross-sectional view of the premixed combustion burner 1 shown in FIG. 1. FIGS. 3 to 9 are cross-sectional views of portions denoted by reference signs III to IX shown in the premixed combustion burner 1 in FIG. 2.

As shown in FIG. 1 and FIG. 2, in the premixed combustion burner 1 according to the present embodiment, a burner axis A is defined at the center thereof, and the extending direction of the burner axis A is defined as an axial direction A1. The axial direction A1 is parallel to the ejection direction of premixed gas comprising gas fuel and air. The premixed combustion burner 1, as a whole, has a thick cylindrical shape that has the burner axis A as the axis thereof, and that has a closed proximal end and an open leading end.

The premixed combustion burner 1 includes: a nozzle part 11, a mixing part 12 provided on the proximal end side of the nozzle part 11; and a header part 13 provided on the proximal end side of the mixing part 12.

As shown in FIGS. 1, 2, 7, and 8, the nozzle part 11 has a thick cylindrical shape having the burner axis A as the center thereof. A premixed gas passage 18 is formed at the inner periphery of the nozzle part 11. The leading end of the nozzle part 11 is a nozzle tip 14 from which the premixed gas that has flowed in the axial direction A1 in the premixed gas passage 18 is ejected.

A cooling passage 4 through which the gas fuel passes is provided throughout in a second peripheral wall 111 of the nozzle part 11. The cooling passage 4 includes a plurality of inlets 41 and outlets 42 at a proximal end portion of the nozzle part 11. The inlets 41 and the outlets 42 are alternately arranged in a circumferential direction C1 of the nozzle part 11. In the present embodiment, four sets of an inlet 41 and an outlet 42 are alternately arranged in the circumferential direction.

Figure 9:
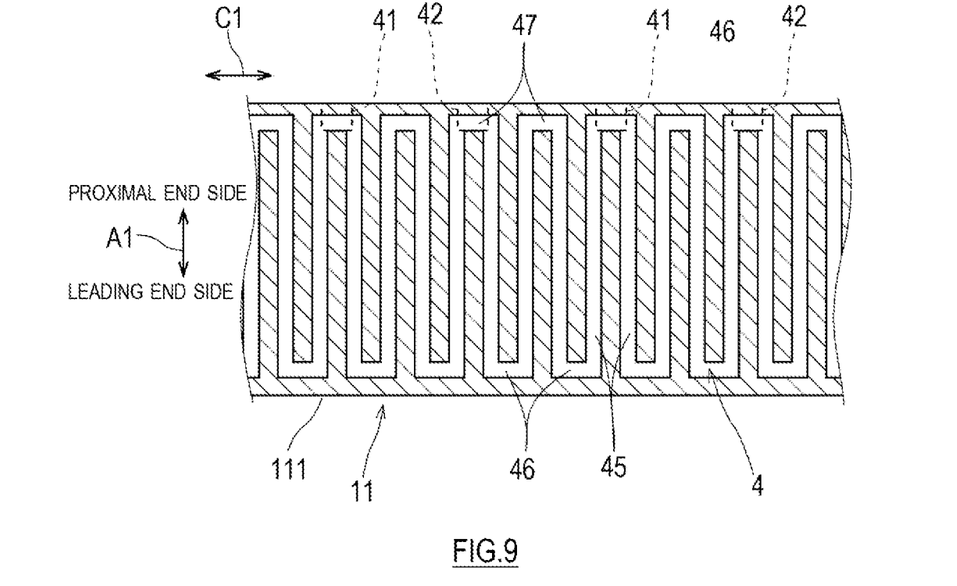
FIG. 9 is across-sectional view along IX-IX shown in FIG. 2 (development of a cross-section along the circumferential direction of a peripheral wall of a nozzle part).

FIG. 9 is a development of a cross-section along the circumferential direction of the second peripheral wall 111 of the nozzle part 11. As shown in FIG. 9, the cooling passage 4 includes: a plurality of linear portions 45 arranged in the circumferential direction C1 of the nozzle part 11; turn-back portions 46 each connecting linear portions 45 adjacent to each other at a leading end portion of the nozzle part 11; and turn-back portions 47 each connecting linear portions 45 adjacent to each other at the proximal end portion of the nozzle part 11. The turn-back portions 46 at the leading end portion and the turn-back portions 47 at the proximal end portion are alternately provided in the series of the cooling passage 4. That is, the cooling passage 4 is formed such that a linear portion 45, a turn-back portion 46, a linear portion 45, and a turn-back portion 47 are repeated in order. The cooling passage 4 advances in the circumferential direction C1 of the nozzle part 11 while meandering in the axial direction A1.

Figure 6:
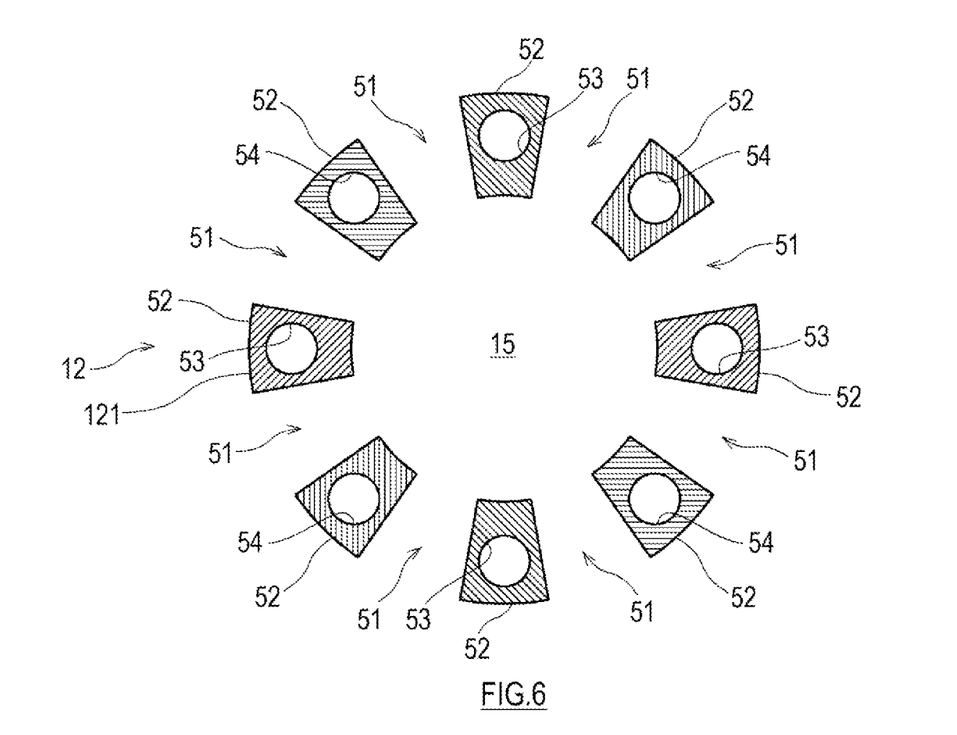
FIG. 6 is a cross-sectional view along VI-VI shown in FIG. 2.
Figure 7:
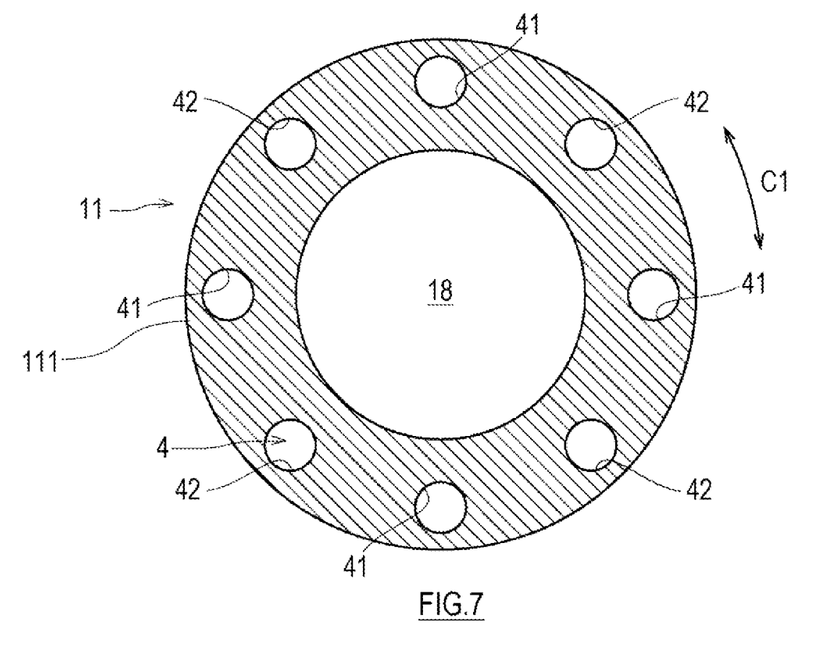
FIG. 7 is a cross-sectional view along VII-VII shown in FIG. 2.
Figure 8:
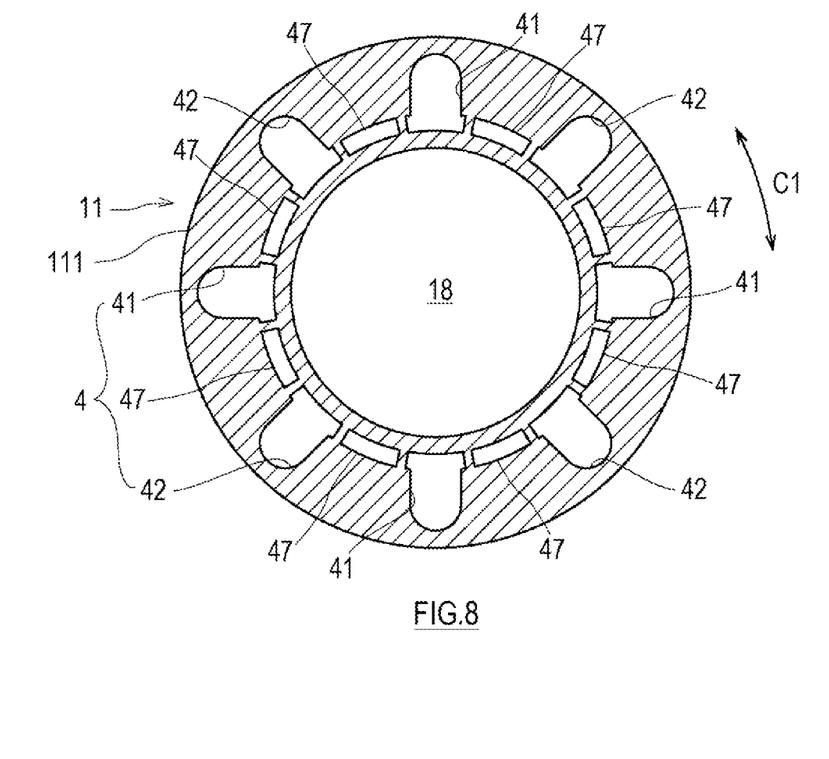
FIG. 8 is a cross-sectional view along VIII-VIII shown in FIG. 2.

As shown in FIGS. 1, 2, and 6, the mixing part 12 has a thick cylindrical shape having the burner axis A as the center thereof. A mixing region 15 for mixing the gas fuel and air is formed on the inner periphery side of the mixing part 12. The mixing region 15 and the premixed gas passage 18 are continuous with each other in the axial direction A1.

A plurality of air supply ports 51 for introducing air are open in a first peripheral wall 121 of the mixing part 12. The plurality of air supply ports 51 are arranged in the circumferential direction. Between air supply ports 51 adjacent to each other, a column portion 52 extending in the axial direction A1 is formed. Each column portion 52 is provided with an outward path 53 or a return path 54 extending in the axial direction A1. Each outward path 53 is connected to a corresponding inlet 41 of the cooling passage 4. Each return path 54 is connected to a corresponding outlet 42 of the cooling passage 4. Therefore, similar to the inlets 41 and the outlets 42 of the cooling passage 4, the outward paths 53 and the return paths 54 are alternately arranged in the circumferential direction.

As shown in FIGS. 1 to 5, the header part 13 has formed therein a first header chamber 61, a fuel supply port 64 for supplying the gas fuel to the first header chamber 61, a second header chamber 62, and fuel ejection ports 65 that allow communication between the second header chamber 62 and the mixing region 15. The first header chamber 61 and the second header chamber 62 are arranged in the axial direction A1. The first header chamber 61 is on the proximal end side of the second header chamber 62.

The first header chamber 61 is connected to a gas fuel supply source via the fuel supply port 64. The first header chamber 61 is supplied with the gas fuel through the fuel supply port 64. In addition, the first header chamber 61 is provided with outward path connection portions 53a. Each outward path connection portion 53a is connected to a corresponding outward path 53 of the mixing part 12. Accordingly, the gas fuel in the first header chamber 61 flows via the outward path connection portion 53a into the outward path 53.

The second header chamber 62 is provided with return path connection portions 54a. Each return path connection portion 54a is connected to a corresponding return path 54 of the mixing part 12. Accordingly, the gas fuel flows into the second header chamber 62 from the return path 54. In addition, a plurality of fuel ejection ports 65 are open in the second header chamber 62. Each fuel ejection port 65 is open toward the mixing region 15, in parallel to the axial direction A1. Accordingly, the gas fuel in the second header chamber 62 is ejected in the axial direction A1 through the fuel ejection port 65 to the premixed gas passage 18.

In the premixed combustion burner 1 having the above configuration, the gas fuel sent under pressure from the gas fuel supply source flows through the fuel supply port 64 into the first header chamber 61. The gas fuel having flowed into the first header chamber 61 is distributed to the plurality of outward paths 53 arranged in the circumferential direction, passes through the outward paths 53 in the axial direction A1, and reaches the inlets 41 of the cooling passage 4. The gas fuel having flowed from the inlets 41 into the cooling passage 4, passes through the cooling passage 4, and reaches the outlets 42. Due to the gas fuel having a low temperature and passing through the cooling passage 4, the second peripheral wall 111 of the nozzle part 11 is cooled. The gas fuel having gone out of the outlets 42 of the cooling passage 4, passes through the return paths 54 in the axial direction A1, and flows into the second header chamber 62. The gas fuel having flowed into the second header chamber 62 is ejected through the plurality of fuel ejection ports 65 into the mixing region 15. In the mixing region 15, air introduced from the air supply ports 51 and the gas fuel are mixed, whereby premixed gas is generated. The generated premixed gas passes through the premixed gas passage 18 in the axial direction A1 and is ejected from the nozzle tip 14.

As described above, the premixed combustion burner 1 according to the present embodiment includes: the mixing part 12; the nozzle part 11 provided on the leading end side of the mixing part 12; and the header part 13 provided on the proximal end side of the mixing part 12. The mixing part 12 includes the first peripheral wall 121 having the burner axis A as the center thereof, includes the mixing region 15, for mixing the gas fuel and air, formed at the inner periphery of the first peripheral wall 121, and includes the plurality of air supply ports 51 arranged in the circumferential direction and open in the first peripheral wall 121. The nozzle part 11 includes the second peripheral wall 111 having the burner axis A as the center thereof, includes the premixed gas passage 18 continuous to the mixing region 15 and formed at the inner periphery of the second peripheral wall 111, and includes the cooling passage 4 formed in the second peripheral wall 111. The header part 13 has formed therein the first header chamber 61, the fuel supply port 64 for supplying the gas fuel to the first header chamber 61, the second header chamber 62, and the fuel ejection ports 65 that allow communication between the second header chamber 62 and the mixing region 15. The first peripheral wall 121 of the mixing part 12 has formed therein the outward paths 53 that connect the first header chamber 61 and the inlets 41 of the cooling passage 4, and the return paths 54 that connect the outlets 42 of the cooling passage 4 and the second header chamber 62.

In the premixed combustion burner 1 having the above configuration, a series of fuel flow paths composed of the first header chamber 61, the outward paths 53, the cooling passage 4, the return paths 54, and the second header chamber 62 are formed, and the gas fuel having a low temperature flows in this fuel passage. Accordingly, the second peripheral wall 111 of the nozzle part 11 and the first peripheral wall 121 of the mixing part 12 are cooled through heat exchange with the gas fuel having a low temperature and flowing therein.

As for the thinning due to oxidation of the nozzle part 11, contact between the premixed gas having a high temperature and the second peripheral wall 111 of the nozzle part 11 causes oxide scale to be generated at the surface of the second peripheral wall 111, and the thinning due to oxidation of the nozzle part 11 progresses due to breakage or separation of this scale. In the premixed combustion burner 1 according to the present embodiment, the second peripheral wall 111 of the nozzle part 11 is cooled, and the temperature of the surface of the second peripheral wall 111 is suppressed from becoming high. Therefore, generation of oxide scale at the surface of the second peripheral wall 111 of the nozzle part 11 is suppressed, and accordingly, thinning due to oxidation of the nozzle part 11 is suppressed.

When the temperature of the nozzle part 11 becomes high, the temperature of the premixed gas passing through the premixed gas passage 18 becomes high, and the combustion speed is increased. In contrast, in the premixed combustion burner 1 according to the present embodiment, rise in the temperature of the premixed gas passing through the premixed gas passage 18 is suppressed by cooling of the nozzle part 11. Therefore, increase in the combustion speed of the premixed gas can be suppressed. Further, since rise in the temperature of the premixed gas is suppressed also by cooling of the first peripheral wall 121 of the mixing part 12, increase in the combustion speed of the premixed gas can be further effectively suppressed.

As described above, in the premixed combustion burner 1, increase in the combustion speed of the premixed gas is suppressed. Therefore, when compared with a case where the nozzle part 11 is not cooled, flame can be kept away from the nozzle tip 14. Accordingly, the temperature of the nozzle part 11 can be further suppressed from becoming high, and erosion of the nozzle part 11 due to flame can be prevented.

When the combustion speed is faster than the flow speed of the premixed gas, flashback is caused. In contrast, in the premixed combustion burner 1 according to the present embodiment, increase in the combustion speed is suppressed as described above, and thus, occurrence of flashback is suppressed. Further, in the premixed combustion burner 1 according to the present embodiment, the second peripheral wall 111 of the nozzle part 11 is continuously cooled. Therefore, even when flame has entered the premixed gas passage 18 through the nozzle tip 14, the flame comes into contact with the second peripheral wall 111 having been cooled, and is extinguished. Therefore, in the premixed combustion burner 1, flashback can be assuredly prevented.

The combustion speed of hydrogen gas is faster than that of natural gas. Therefore, a burner that combusts fuel containing hydrogen gas has a higher possibility of occurrence of flashback than a burner that combusts only natural gas as the fuel. In contrast, in the premixed combustion burner 1 according to the present embodiment, occurrence of flashback is suppressed as described above, and thus, a high concentration hydrogen gas, which cannot be used in an ordinary burner, can be used as fuel.

In the premixed combustion burner 1 according to the present embodiment, the cooling passage 4 includes: the plurality of linear portions 45 arranged in the circumferential direction C1 of the nozzle part 11; and the turn-back portions 46, 47 that connect linear portions 45 adjacent to each other at the leading end portion or the proximal end portion of the nozzle part 11. The cooling passage 4 advances in the circumferential direction C1 of the nozzle part 11 while meandering in the axial direction A1.

Thus, in the cooling passage 4, the turn-back portions 46 are provided at the leading end portion where, in the nozzle part 11, the temperature becomes highest. In each turn-back portion 46, collision between the second peripheral wall 111 of the nozzle part 11 and the gas fuel flowing in the cooling passage 4 is caused. Therefore, the second peripheral wall 111 of the nozzle part 11 can be more effectively cooled. The cooling passage 4 meanders in the second peripheral wall 111 of the nozzle part 11, and accordingly, the gas fuel can be caused to evenly pass through the second peripheral wall 111. Therefore, occurrence of bias in cooling of the second peripheral wall 111 and occurrence of stagnation of the gas fuel in the cooling passage 4 can be suppressed.

In the premixed combustion burner 1 according to the present embodiment, the mixing part 12 includes a plurality of sets of the outward path 53 and the return path 54 each extending in the axial direction A1 of the burner axis A, and the outward paths 53 and the return paths 54 are alternately arranged in the circumferential direction of the mixing part 12.

Thus, in the first peripheral wall 121 of the mixing part 12, the outward paths 53 in each of which the gas fuel before entering the cooling passage 4 flows and the return paths 54 in each of which the gas fuel having passed through the cooling passage 4 flows are alternately present in the circumferential direction. Accordingly, the first peripheral wall 121 of the mixing part 12 can be evenly cooled.

While the preferred embodiment of the present invention has been described above, the details of specific structures and/or functions of the above embodiment may be modified without departing from the scope of the present invention, and such modifications can be included in the present invention. For example, the configuration of the cooling passage 4 described above can be modified as described below.

[Modification 1 of Cooling Passage 4]

Figure 10:
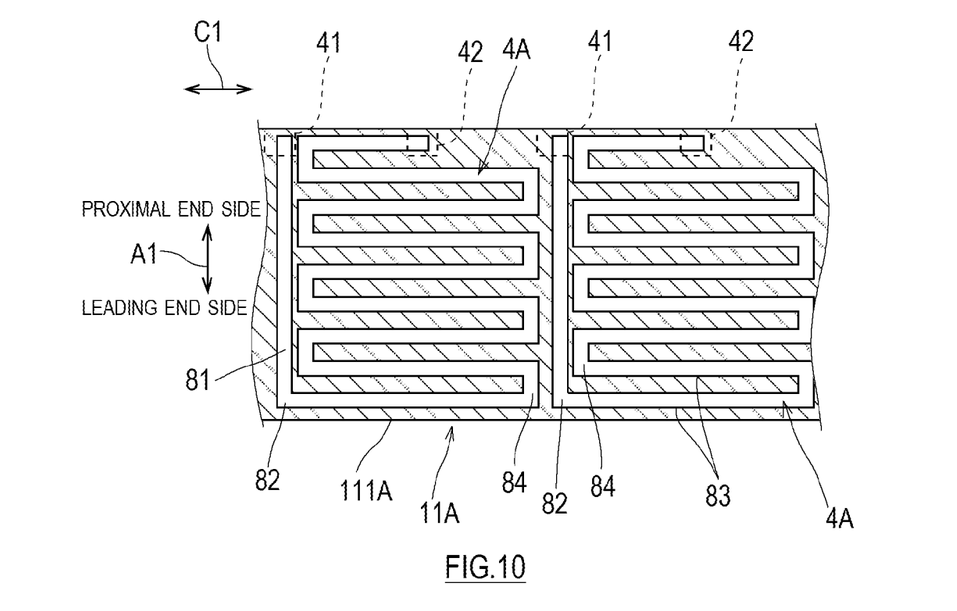
FIG. 10 is a development of a cross-section, showing cooling passages 4A according to Modification 1, along the circumferential direction of a peripheral wall of a nozzle part.

FIG. 10 is a development of a cross-section, showing cooling passages 4A according to Modification 1, along the circumferential direction of a second peripheral wall 111A of a nozzle part 11A. As shown in FIG. 10, each cooling passage 4A according to Modification 1 meanders in the circumferential direction C1 in the second peripheral wall 111A of the nozzle part 11A. More specifically, the cooling passage 4A includes: an introduction portion 81 extending in the axial direction A1; a bent portion 82 provided at the leading end portion of the nozzle part 11; a plurality of arc portions 83 arranged in the axial direction A1; and turn-back portions 84 each connecting arc portions adjacent to each other. The cooling passage 4 first reaches the leading end portion of the nozzle part 11 in the form of the introduction portion 81 and the bent portion 82, and then meanders, in the form of repetition of the arc portion 83 and the turn-back portion 84, in the circumferential direction C1 of the nozzle part 11, to advance in the axial direction A1.

In this cooling passage 4A, the gas fuel flows first at the leading end portion where, in the nozzle part 11, the temperature becomes highest. Thus, the leading end portion of the nozzle part 11 is actively cooled.

[Modification 2 of Cooling Passage 4]

Figure 11:
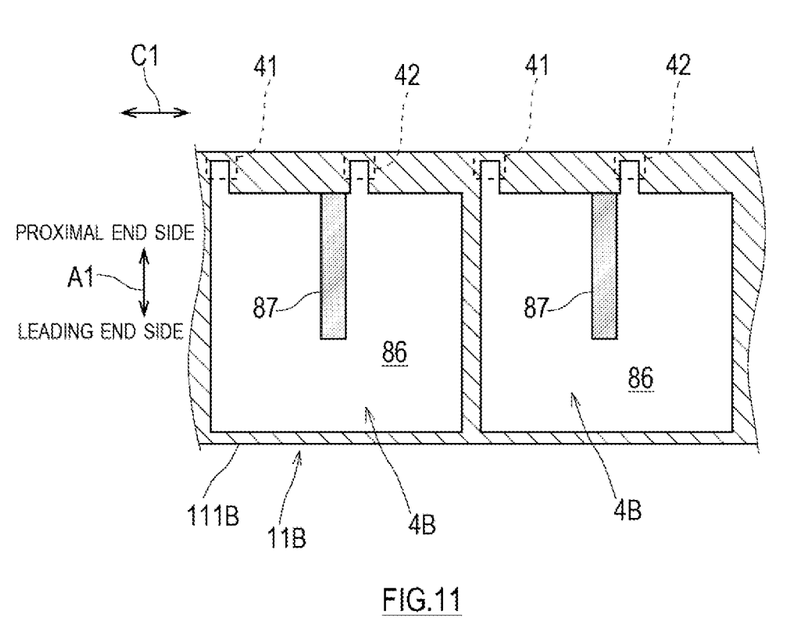
FIG. 11 is a development of a cross-section, showing cooling passages 4B according to Modification 2, along the circumferential direction of a peripheral wall of a nozzle part.

FIG. 11 is a development of a cross-section, showing cooling passages 4B according to Modification 2, along the circumferential direction of a second peripheral wall 111B of a nozzle part 11B. As shown in FIG. 11, each cooling passage 4B according to Modification 2 is a space 86 formed in the second peripheral wall 111B of the nozzle part 11B, and having a tubular shape or a divided tubular shape. In the space 86, a straightening plate 87 that guides, toward the leading end portion of the nozzle part 11, the gas fuel having entered from the inlet 41 provided at the proximal end portion of the nozzle part 11 is provided at an appropriate position. The straightening plate 87 also functions as a rib that reinforces the second peripheral wall 111B.

In the cooling passage 4B, a slight bias is likely to occur in the flow of the gas fuel, when compared with the cooling passage 4 according to the embodiment. However, processing of the cooling passage 4B is easy.

The invention claimed is:
1. A premixed combustion burner comprising:
a mixing part that includes a first peripheral wall having a burner axis as a center thereof, that includes a mixing region for mixing gas fuel and air at an inner periphery of the first peripheral wall, and that includes a plurality of air supply ports arranged in a circumferential direction and open in the first peripheral wall;
a nozzle part that is on a leading end side of the mixing part, that includes a second peripheral wall having the burner axis as a center thereof, that includes a premixed gas passage continuous to the mixing region at an inner periphery of the second peripheral wall, and that includes a cooling passage in the second peripheral wall; and
a header part that is on a proximal end side of the mixing part, and that has therein a first header chamber, a fuel supply port configured to supply the gas fuel to the first header chamber, a second header chamber, and a fuel ejection port that allows communication between the second header chamber and the mixing region, wherein
the first peripheral wall has therein an outward path that connects the first header chamber and an inlet of the cooling passage, and a return path that connects an outlet of the cooling passage and the second header chamber, and
the cooling passage includes a plurality of linear portions arranged in a circumferential direction of the nozzle part, and a turn-back portion that connects the linear portions adjacent to each other at a leading end portion or a proximal end portion of the nozzle part, and the cooling passage advances in the circumferential direction of the nozzle part while meandering in an axial direction of the burner axis.

2. A premixed combustion burner comprising:
a mixing part that includes a first peripheral wall having a burner axis as a center thereof, that includes a mixing region for mixing gas fuel and air at an inner periphery of the first peripheral wall, and that includes a plurality of air supply ports arranged in a circumferential direction and open in the first peripheral wall;
a nozzle part that is on a leading end side of the mixing part, that includes a second peripheral wall having the burner axis as a center thereof, that includes a premixed gas passage continuous to the mixing region at an inner periphery of the second peripheral wall, and that includes a cooling passage in the second peripheral wall; and a header part that is on a proximal end side of the mixing part, and that has therein a first header chamber, a fuel supply port configured to supply the gas fuel to the first header chamber, a second header chamber, and a fuel ejection port that allows communication between the second header chamber and the mixing region, wherein the first peripheral wall has therein an outward path that connects the first header chamber and an inlet of the cooling passage, and a return path that connects an outlet of the cooling passage and the second header chamber, and the mixing part includes a plurality of sets of the outward path and the return path extending in an axial direction of the burner axis, and the outward paths and the return paths are alternately arranged in the circumferential direction of the mixing part.

3. The premixed combustion burner according to claim 1, wherein the mixing part includes a plurality of sets of the outward path and the return path extending in an axial direction of the burner axis, and the outward paths and the return paths are alternately arranged in the circumferential direction of the mixing part.

* * * * *